(12) United States Patent
Roark et al.

(10) Patent No.: US 7,600,605 B2
(45) Date of Patent: Oct. 13, 2009

(54) AIRCRAFT GROUND RUN-UP ENCLOSURE

(75) Inventors: Michael E. Roark, Lee's Summit, MO (US); Mark S. Boe, Reno, NV (US); Werner Hoelmer, Cincinnati, OH (US); Joop H. M. Gooden, Steenwijk (NL); Gerold de Valk, Vlaardingen (NL); Rene Parchen, Schiedam (NL); Barie Brettmann, Overland Park, KS (US)

(73) Assignee: Burns & McDonnell Engineering Company, Inc., Kansas City, MO (US)

( * ) Notice: Subject to any disclaimer, the term of this patent is extended or adjusted under 35 U.S.C. 154(b) by 270 days.

(21) Appl. No.: 10/558,324

(22) PCT Filed: May 28, 2003

(86) PCT No.: PCT/US03/16753

§ 371 (c)(1),
(2), (4) Date: Oct. 26, 2006

(87) PCT Pub. No.: WO2004/106161

PCT Pub. Date: Dec. 9, 2004

(65) Prior Publication Data

US 2007/0151797 A1    Jul. 5, 2007

(51) Int. Cl.
*B64F 1/26*       (2006.01)
*B64F 1/00*       (2006.01)
(52) U.S. Cl. ............ 181/210; 181/203; 244/114 B
(58) Field of Classification Search ............ 181/210, 181/285, 203, 218, 217; 244/114 B, 1 N
See application file for complete search history.

(56) References Cited

U.S. PATENT DOCUMENTS

| | | | | |
|---|---|---|---|---|
| 2,720,276 A | * | 10/1955 | Droeger | ............ 181/203 |
| 2,842,222 A | | 7/1958 | Hughett | |
| 3,011,584 A | * | 12/1961 | Lemmerman et al. | ........ 181/217 |
| 3,037,726 A | * | 6/1962 | Phillips | ............ 244/114 B |
| 3,185,252 A | * | 5/1965 | Lemmerman | ............ 181/217 |
| 3,349,868 A | * | 10/1967 | Kurtze | ............ 181/217 |
| 3,604,530 A | * | 9/1971 | Duthion et al. | ............ 181/210 |

(Continued)

FOREIGN PATENT DOCUMENTS

DE        3902664 A1 *    8/1989

(Continued)

OTHER PUBLICATIONS

Creating a Quieter World, Blast Deflectors, Inc., Noise Attenuating Runup Enclosures for Airports, http://www.blastdeflectors.com/pdf/GRE_Brochure.pdf.

*Primary Examiner*—Edgardo San Martin
(74) *Attorney, Agent, or Firm*—Stinson Morrison Hecker LLP

(57) ABSTRACT

A ground run up enclosure (10) which comprises an air inlet structure (12), a test chamber (14), an acoustic enclosure (16) and a main enclosure door (118). The air inlet structure (12) is adapted to receive ambient air and redirect it into the test chamber (14). The test chamber (14) is designed to receive a portion of an aircraft (20) therein. The acoustic enclosure (16) receives the airflow from the test chamber (14). The airflow continues through the acoustic enclosure (14) until it contacts a front surface of the main enclosure door (118) and is redirected upward and out of the enclosure.

26 Claims, 11 Drawing Sheets

U.S. PATENT DOCUMENTS

| | | | |
|---|---|---|---|
| 3,620,329 A | 11/1971 | Wenzlaff | |
| 3,630,313 A | 12/1971 | Smith | |
| 3,688,865 A * | 9/1972 | Smith et al. | 181/218 |
| 3,715,009 A * | 2/1973 | Smith et al. | 181/218 |
| 3,842,941 A | 10/1974 | Gerber | |
| 4,122,912 A | 10/1978 | Lepor | |
| 4,573,551 A * | 3/1986 | Schwerdtner et al. | 181/218 |
| 4,958,700 A | 9/1990 | Schafhaupt | |
| 5,293,775 A * | 3/1994 | Clark et al. | 73/116.03 |
| 5,377,534 A | 1/1995 | Boet | |
| 5,396,793 A * | 3/1995 | Colletti | 73/116.03 |
| 5,495,754 A * | 3/1996 | Starr et al. | 73/147 |
| 5,591,904 A | 1/1997 | Schafhaupt et al. | |
| 5,837,890 A | 11/1998 | Long | |
| 5,856,640 A | 1/1999 | Lynn | |
| 6,016,888 A | 1/2000 | Lynn | |
| 6,162,011 A * | 12/2000 | Gerhardt et al. | 415/1 |
| 6,497,137 B2 * | 12/2002 | Helgeson | 73/23.31 |
| 6,637,168 B2 | 10/2003 | Satomi et al. | |
| 6,802,690 B2 * | 10/2004 | Han et al. | 415/119 |
| 6,910,370 B2 * | 6/2005 | Clark et al. | 73/118.03 |

FOREIGN PATENT DOCUMENTS

| | | |
|---|---|---|
| EP | 1249393 A | 10/2002 |
| GB | 774550 A | 5/1957 |
| GB | 2337301 A | 11/1999 |
| JP | 02077397 A * | 3/1990 |

* cited by examiner

AIRCRAFT GROUND RUN-UP ENCLOSURE

FIELD OF THE INVENTION

This invention relates to aircraft ground run-up enclosures, and more particularly to an aircraft ground run-up enclosure that reduces noise levels without substantially negatively altering the aerodynamics necessary to successfully complete a ground run-up procedure.

DESCRIPTION OF RELATED ART

Ground run-ups are routine aircraft engine maintenance tests which require the operation of an engine at various power levels from idle to full for extended periods of time generating continuous elevated noise levels. Currently, ground run-ups are done on a remote taxiway, or runway on the airport with the aircraft pointed into the wind. In more congested areas, ground run-ups occur in a ground run-up enclosure, sometimes referred to as a "Hush House." The prior art ground run-up enclosures use acoustic barrier walls to reduce the environmental impact of the noise associated with aircraft engine ground run-up procedures.

First and foremost, with many types of ground run-up enclosures, the aircraft is surrounded on only three sides with walls. This reduces the aerodynamic effectiveness of the enclosure in certain wind conditions. If the aerodynamics do not allow for effective testing of the engines, the enclosure is unusable during those times that the undesirable wind conditions exist.

Furthermore, the noise generated during an aircraft ground run-up procedure violates the noise limitation around areas of certain airports and limit the times during which this type of engine testing can occur.

Completely enclosed aircraft ground run-up enclosures on the other hand, do not have the proper aerodynamics to allow a propeller driven aircraft to perform a ground run-up test.

BRIEF SUMMARY OF THE INVENTION

The present invention overcomes the disadvantages of the prior art by providing a novel ground run up enclosure which is comprised of an air inlet structure, a test chamber, an acoustic enclosure and a main enclosure door. The air inlet structure is adapted to receive ambient air and direct it into the test chamber. The test chamber is designed to receive a portion of an aircraft therein. The acoustic enclosure receives the airflow from the test chamber. The airflow continues through the acoustic enclosure until it contacts a front surface of the main enclosure door and is redirected upward and out of the enclosure.

The test chamber preferably includes a prop ring. The prop ring is configured to focus the airflow on the propellers of an aircraft to provide a more efficient pumping of the propeller/engine system. In one embodiment, the prop ring comprises a pair of side walls that are designed to be moved between an open and a closed position.

In the preferred embodiment, the air inlet structure comprises a flow rectifier adapted to substantially condition airflow passing through the inlet structure to maximize laminar flow and minimize turbulence. The flow rectifier preferably comprises a series of vertical plates that define substantially uniform vertical passages. In one embodiment, the vertical plates form a square grid. The air inlet structure preferably includes a flow conditioning screen that limits the flow of air into the center portions of the flow rectifier.

The air inlet structure preferably comprises a turning vane designed to change the direction of the airflow such that the airflow entering the test chamber is flowing in a substantially horizontal direction. The turning vane preferably comprises a number of individual vanes that are positioned within the air inlet structure to guide the conditioned airflow from the flow rectifier through a change in direction sufficient to present the air flow to the test chamber in a substantially horizontal direction.

In the preferred embodiment, the front surface of the main enclosure door comprises a nose roll. The nose roll is preferably a convex surface that intercepts airflow at ground level and guides it upwards. The use of the nose roll reduces the reflected pressure caused when airflow encounters an obstacle in its path by allowing the airflow to smoothly transition between a substantially horizontal direction to a more vertical direction.

DETAILED DESCRIPTION OF PREFERRED EMBODIMENT

Figure 1:
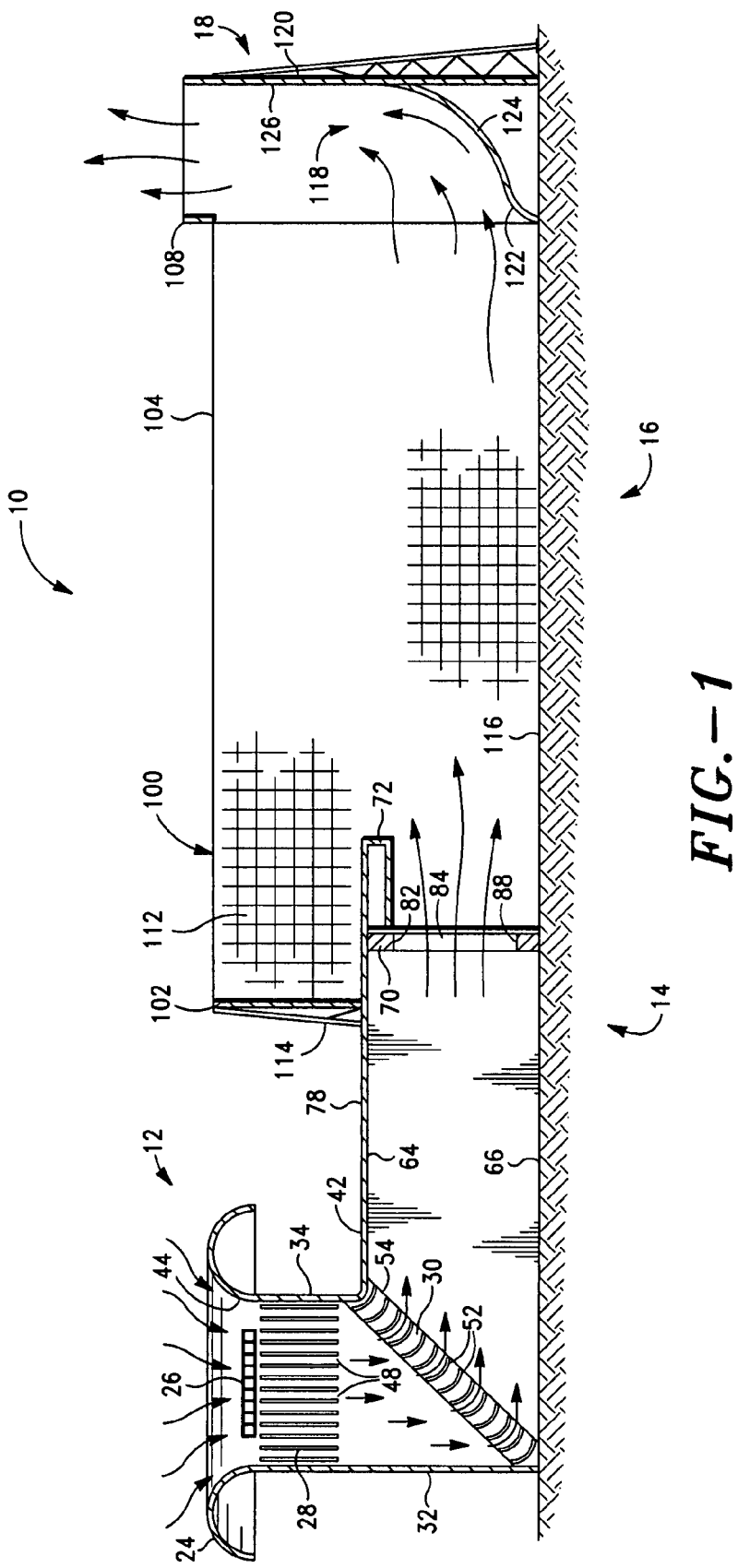
FIG. 1 is a side sectional view of the ground run-up enclosure of the present invention taken along line 1-1 of FIG. 3.
Figure 2:
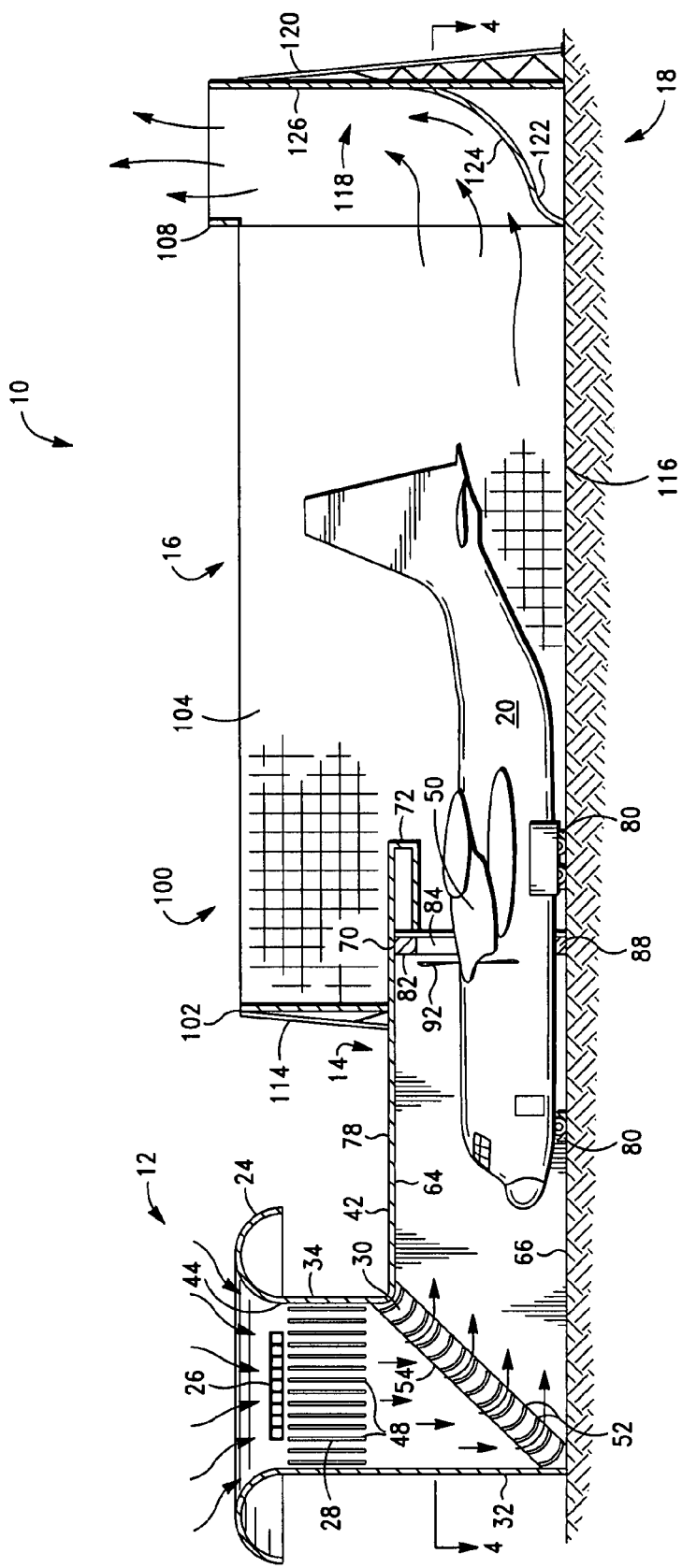
FIG. 2 is a side sectional view of the ground run-up enclosure shown in FIG. 1 with an aircraft in the aircraft testing position.

Referring initially to FIG. 1, a ground run-up enclosure in accordance with a preferred embodiment of the present invention is generally designated by the reference numeral 10. The ground run-up enclosure includes an air inlet structure 12, a test chamber 14, an acoustic enclosure 16 and a main enclosure door 18. Ambient air is taken in through the air inlet structure 12 and passed into the test chamber 14. In use, an aircraft 20 is placed in the ground run-up enclosure in an aircraft testing position with at least a portion of the aircraft located within the test chamber 14. In the preferred embodiment, the aircraft is placed in the ground run-up enclosure such that the propellers and engine 50 are located within the test chamber as shown in FIG. 2. The airflow from the air inlet structure passes into the test chamber and encounters the aircraft engines. The airflow is accelerated through and around the engines and is exhausted from the test chamber 14 into the acoustic enclosure 16. The exhausted airflow then contacts the main enclosure door 18 which directs the airflow out of the ground run-up enclosure 10.

The air inlet structure 12 is preferably located at the front of the aircraft ground run-up enclosure 10, forward of the aircraft testing position. The air inlet structure 12 is adapted to receive ambient air from the atmosphere and to deliver a uniform airflow in a substantially horizontal direction towards the test chamber 14. In the preferred embodiment, the air inlet structure 12 includes inlet walls, a lip roll 24, a flow conditioning screen 26, a flow rectifier 28 and a turning vane 30.

Figure 4:
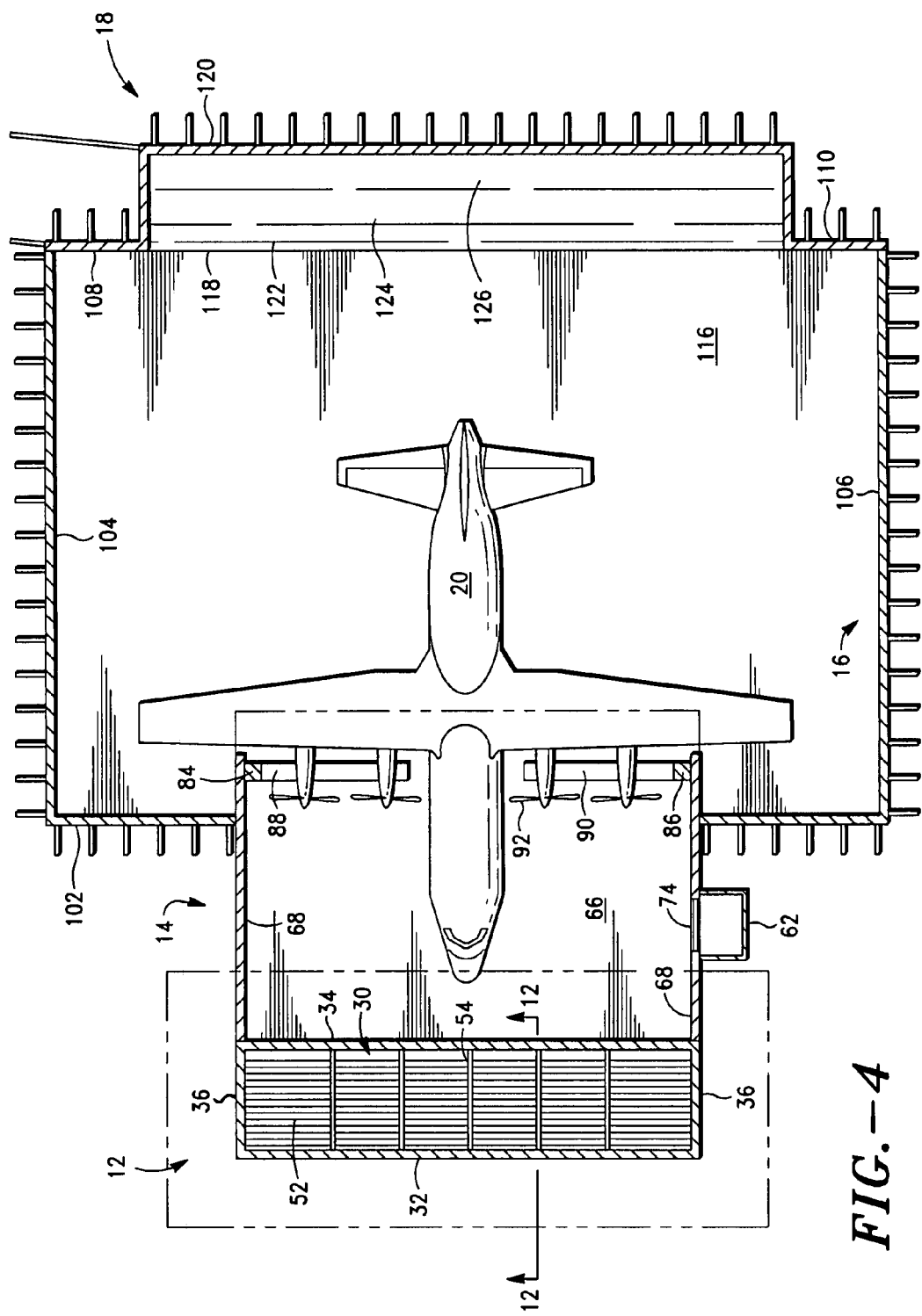
FIG. 4 is a sectional plan view of the ground run-up enclosure shown in FIG. 1 taken along line 4-4 of FIG. 2.
Figure 5:
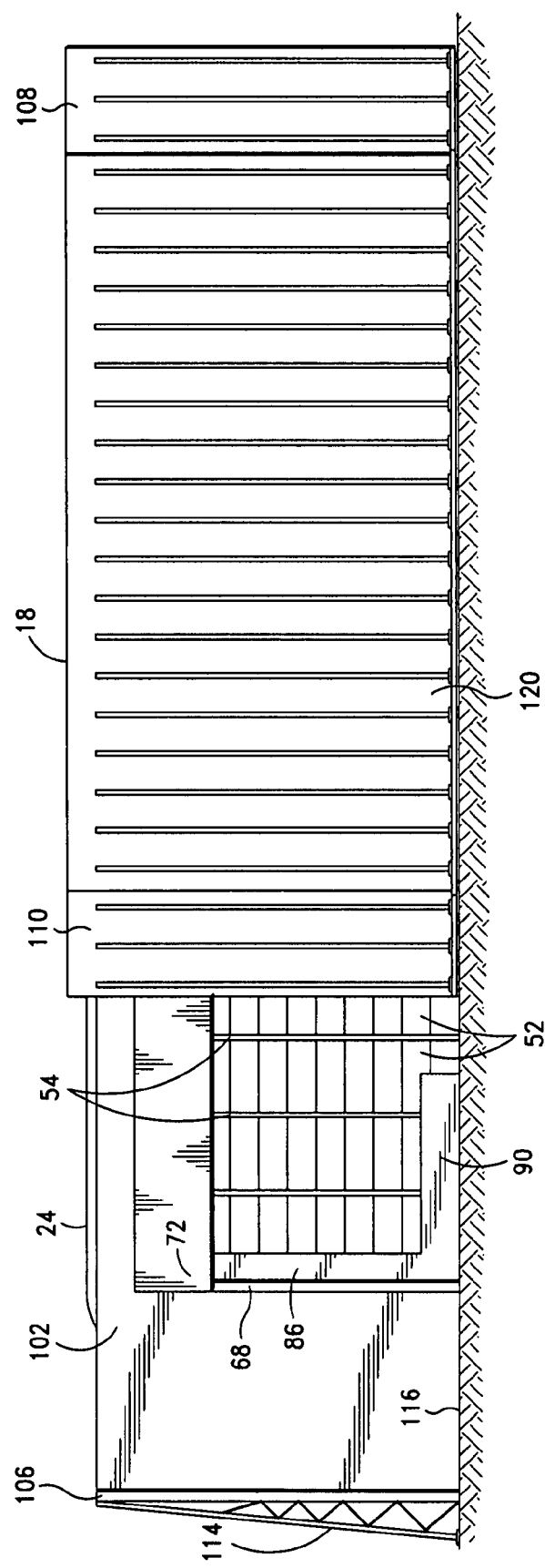
FIG. 5 is a rear elevation view of the ground run-up enclosure shown in FIG. 1.
Figure 6:
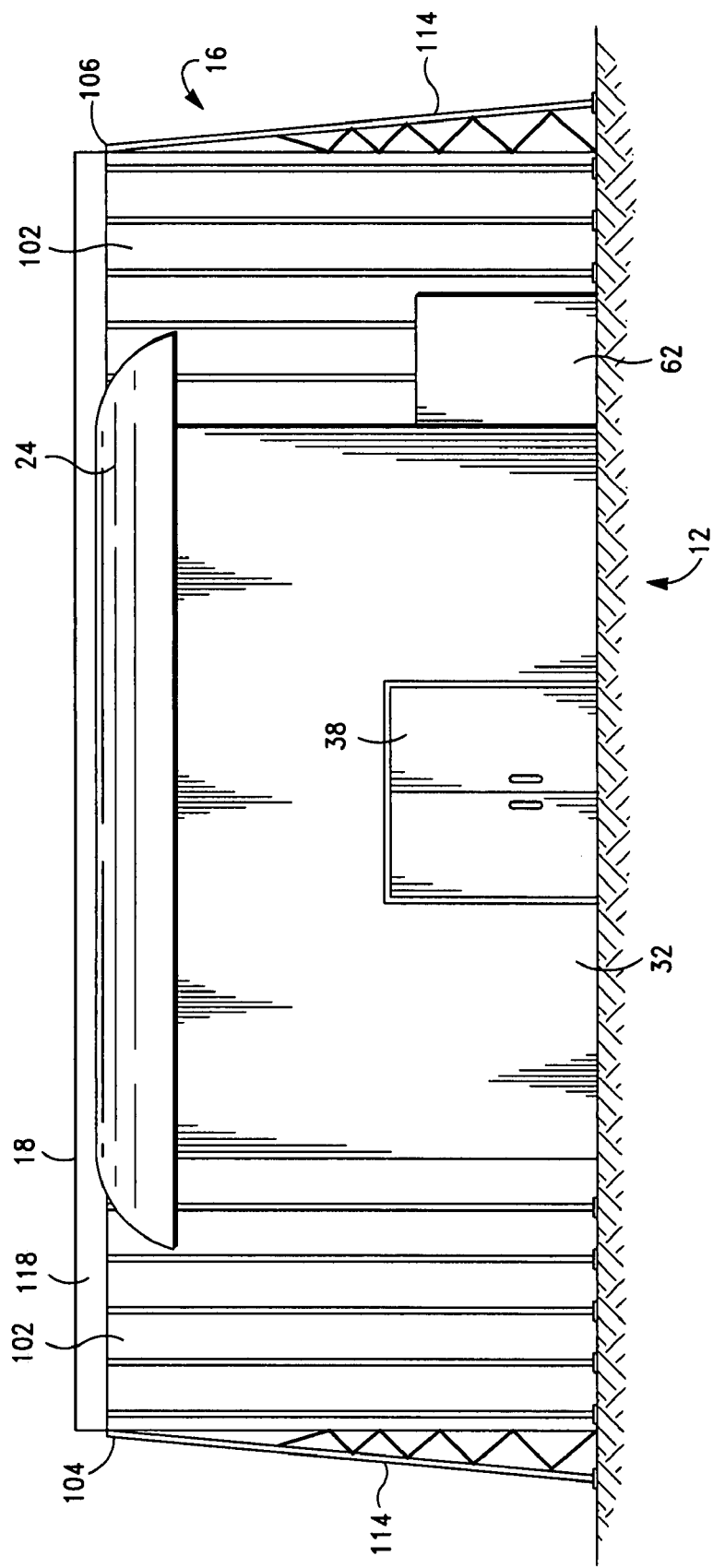
FIG. 6 is a front elevation view of the ground run-up enclosure shown in FIG. 1.
Figure 7:
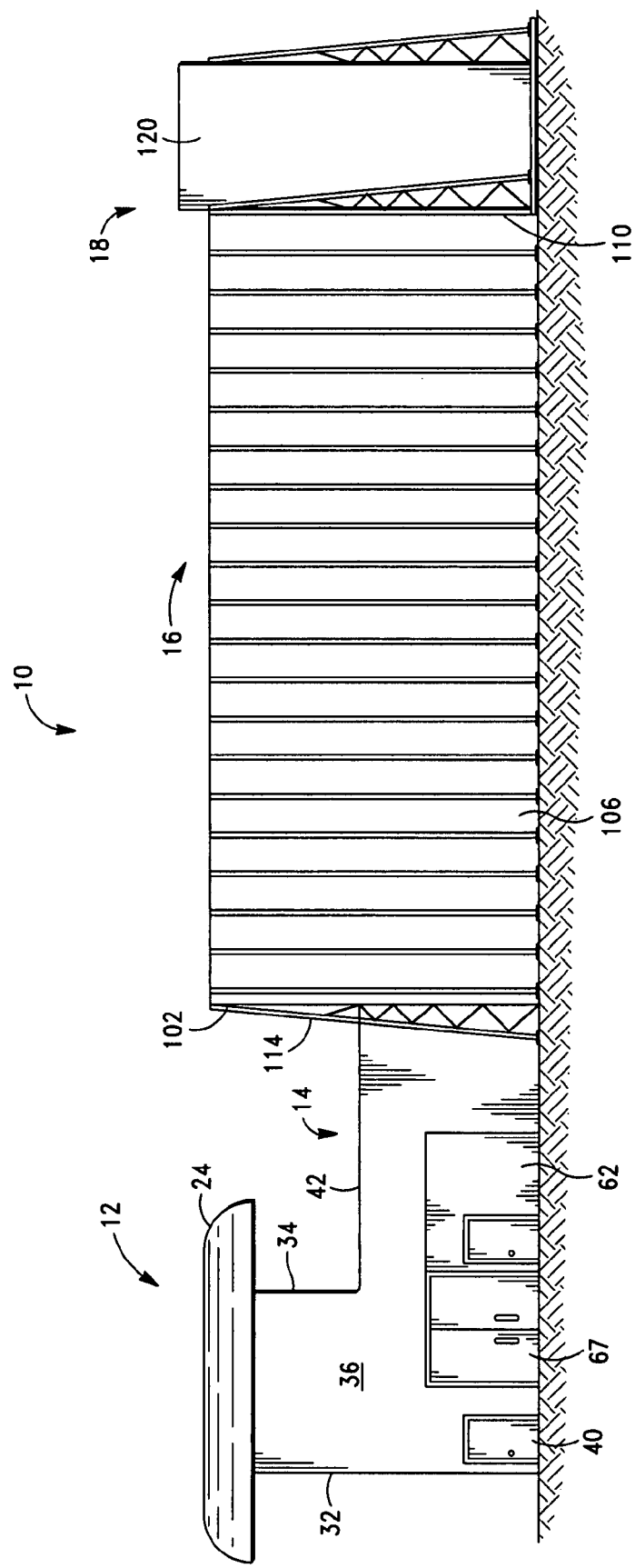
FIG. 7 is a left side elevation view of the ground run-up enclosure shown in FIG. 1.

As shown in FIGS. 1 and 4, inlet walls comprise a front wall 32, a rear wall 34 and two side walls 36. The front wall 32 and two side walls 36 extend vertically upward from the ground or base of the enclosure to lip roll 24. The rear wall 34 extends from the roof 42 of the test chamber 14 to lip roll 24. The front wall 32 preferably includes an opening at the base for equipment access, i.e. an aircraft tug can exit the aircraft ground run-up enclosure 10 through doors 38 located in the front wall 32. The side walls 36 preferably include one or more doors 40 to allow personnel or equipment access to the air inlet structure 12 and/or test chamber 14. Doors 38, 40 are preferably designed to reduce the noise transmitted from the aircraft engines to the outside environment. The doors 38, 40 are preferably acoustical steel doors as are known in the art, but could be created from other acoustic damping designs as well.

The height of the inlet walls is primarily determined by two factors. The first factor is the inlet walls must not be high enough to cause structural turbulence over the airfield. If the inlet walls are too high, they may cause cross winds that may adversely affect airfield and/or runway aerodynamic characteristics. The second factor is the inlet walls must be high enough to allow the flow rectifier 28 to affect the airflow entering the air inlet structure 12 before delivery to the test chamber 14 and to allow the acoustic dampening materials to affect noise levels. The height of walls 32, 34 and 36 is preferably about 10 to 17 meters and is more preferably about 12 to 15 meters.

In the preferred embodiment shown in FIGS. 1 and 4, the front wall 32 and rear wall 34 are spaced apart at least substantially the same as the height of the test chamber 14, and the side walls 36 are spaced apart at least substantially the same as the width of the test chamber 14.

The walls 32, 34, 36 of the air inlet chamber 12 are preferably made from metal wall panels and include acoustic insulation to reduce the noise transmitted from the aircraft engines 50 to the environment outside the aircraft ground run-up enclosure 10. Various other suitable materials could be used for the air inlet walls 32, 34 and 36 as long as the materials provide sufficient support for the air inlet structure 12, the desired acoustical damping effect, and the interior of the inlet walls does not substantially interfere with the purpose of the flow rectifier 28.

Figure 3:
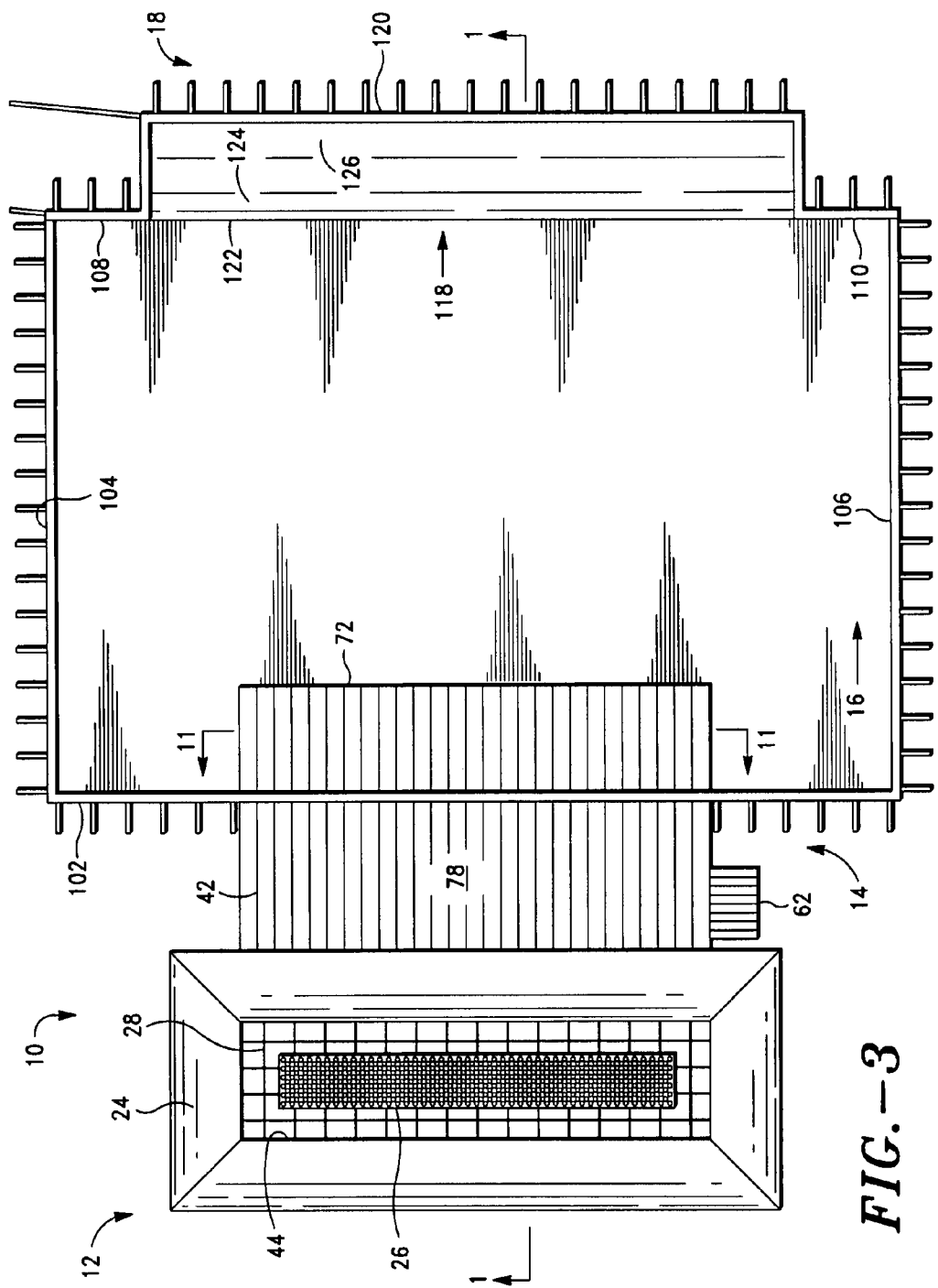
FIG. 3 is a top plan view of the ground run-up enclosure shown in FIG. 1.
Figure 8:
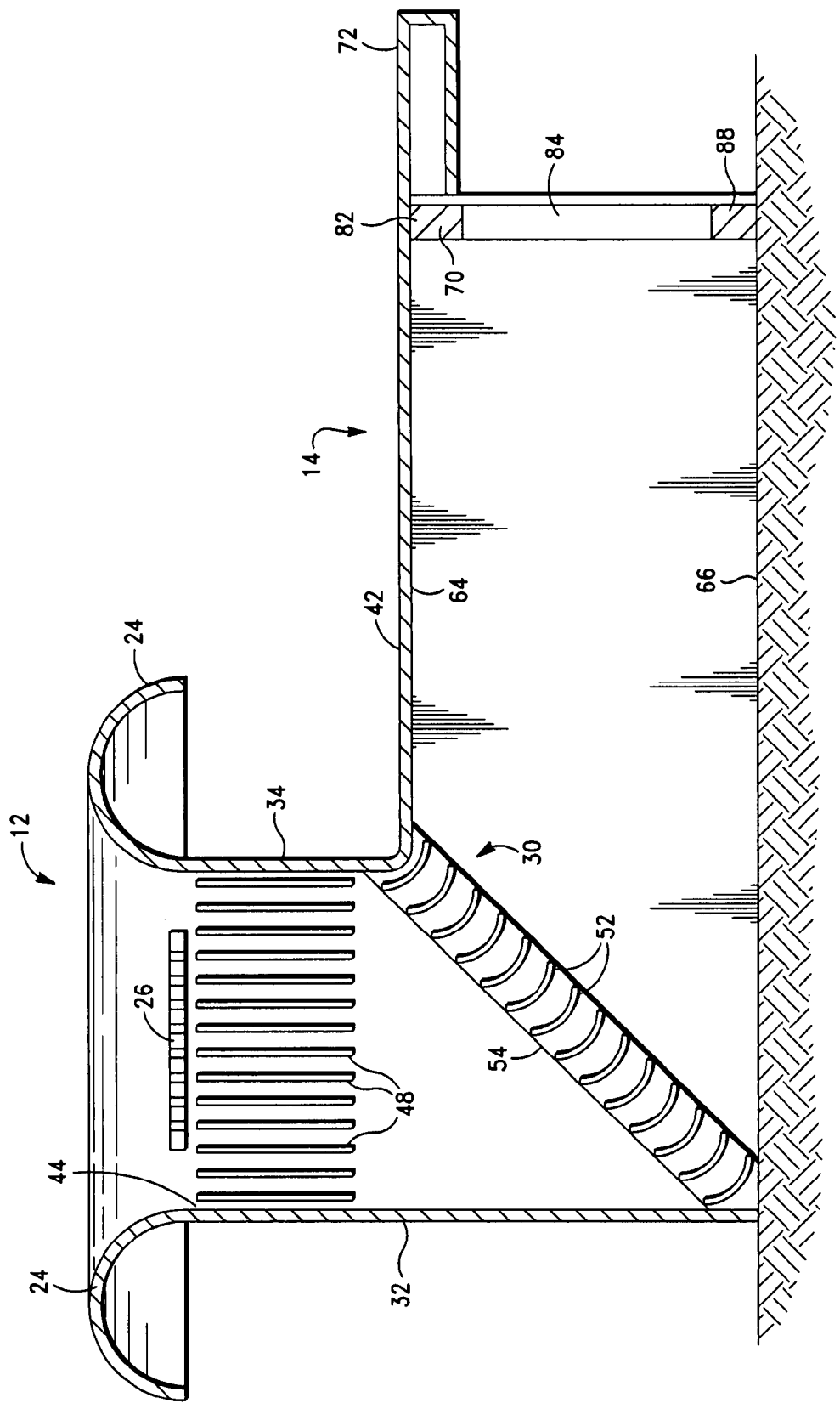
FIG. 8 is a side sectional view of the intake and test chamber of the ground run-up enclosure shown in FIG. 1.
Figure 9:
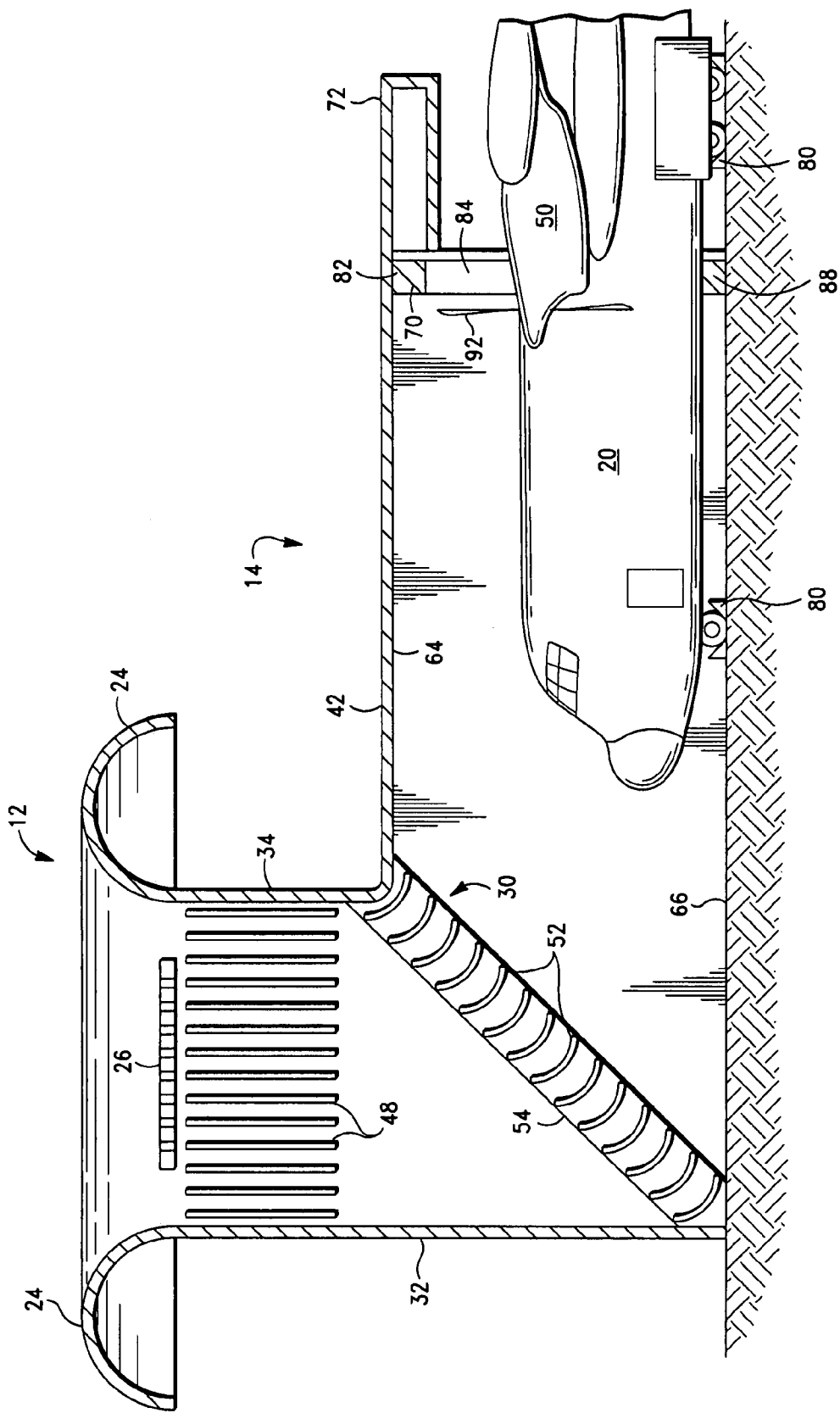
FIG. 9 is a side sectional view of the intake and test chamber of the ground run-up enclosure shown in FIG. 1 with an aircraft in test chamber.

As shown in FIGS. 1, 3 and 8, the inlet walls 32, 34, 36 define an opening 44 in the top of the air inlet structure 12. In the preferred embodiment, lip roll 24 substantially surrounds opening 44 and is integral or otherwise connected to the top of walls 32, 34, 36 and is adapted to condition airflow passing into the inlet structure 12. Lip roll 24 allows airflow to smoothly enter into the air inlet structure 12 over its continuous surface. Airflow attaches to the inner surface of lip roll 24 and is pulled evenly into the air inlet structure 12 through opening 44. As the airflow attaches to lip roll 24 and is pulled inwardly, additional airflow is induced down into the air inlet structure 12. In the most preferred embodiment, the lip roll 24 is constructed such that a portion of the airflow is developed into laminar flow as the airflow attaches to lip roll 24 and is drawn into the opening 44.

In cross section, lip roll 24 is preferably an arc that extends between 90 and 360 degrees. In a more preferred embodiment, the arc length is between 90 and 270 degrees and most preferably around 180 degrees. Lip roll 24 curves into the opening 44 defined by the walls 32, 34, 36 of the air inlet structure 12. Lip roll 24 further comprises a support plate (not shown). The support plate provides structural support for lip roll 24. In the most preferred embodiment, the support plate is positioned in a substantially horizontal position on the underside of lip roll 24 attached to the outer surface.

In the preferred embodiment, the inner surface of lip roll 24 is a smooth surface, but any type of surface that develops airflow entering into the air inlet structure 12 and assists with the prevention of spots of low airflow in the flow rectifier 28 may be utilized. In an alternative embodiment (not shown), the inner surface of lip roll 24 is made from corrugated metal with the corrugations following the curve of the arc. Lip roll 24 is preferably made from metal such as galvanized steel, but any material that would develop airflow as it is drawn into the air inlet structure 12 could be used.

A flow rectifier 28 extends between inlet walls 32, 34, 36 within opening 44, which channels and conditions the airflow as it passes through the air inlet structure 12. The flow rectifier 28 is preferably positioned at or near the top of opening 44. The flow rectifier 28 preferably consists of a series of vertical plates 48 that are attached to the walls 32, 34, 36 of the air inlet structure 12 and define a series of vertical passages for the airflow. The vertical plates are sized in such a manner as to intake ambient airflow and substantially condition it prior to the airflow exiting the flow rectifier 28. In the preferred embodiment, the vertical plates 48 are arranged in a uniform geometry such as a honeycomb, circular, triangular or a square grid. In the preferred embodiment shown in FIGS. 1-3, the flow rectifier 28 consists of a rectangular grid. In the most preferred embodiment, the flow rectifier consists of a square cell grid with each square cell vertical passage having dimensions of about 0.75 meters and a height of about 3.35 meters.

The flow rectifier 28 preferably is made from galvanized steel, but any material that would develop the desired airflow could be used. In the most preferred embodiment, the vertical plates 48 are made from acoustic damping materials as are known in the art to reduce the amount of noise that is transmitted from the aircraft engines 50 to the external environment through the air inlet structure 12 during the ground run-up procedure.

Located above the flow rectifier 28 is a flow conditioning screen 26 adapted to regulate airflow passing through the inlet structure. The flow conditioning screen 26 is preferably configured to prevent the airflow from concentrating in the center of the flow rectifier 28 by partially limiting the airflow to the center vertical air passages. In the preferred embodiment, the flow conditioning screen 26 covers only a central portion of the flow rectifier 28. The flow conditioning screen 26 is most preferably centered on the flow rectifier 28 such that the margin between the screen 26 and the walls 32, 34, 36 of the air inlet structure 12 is constant.

The flow conditioning screen 26 is preferably formed from a material with a porosity in the range of between about 40% to 90%, more preferably between about 60% to 80%, and most preferably about 70%. The flow conditioning screen 26 is preferably formed from a perforated plate having small holes located throughout, however other structures having similar porosity and which develop similar flow characteristics could be used as well. In the preferred embodiment, the flow conditioning screen 26 is made from a metal such as aluminum or galvanized steel.

Turning vane 30 is positioned to intercept the airflow that has exited the flow rectifier 28 and redirect it sufficiently to flow through the test chamber 14 in such a manner as to simulate flight to the aircraft's engines 50 and propellers. The turning vane 30 consists of a number of vertically spaced individual vanes 52. In the preferred embodiment, the individual vanes 52 are held together by horizontally spaced vane supports 54. Each turning vane is shaped as an arc which intercepts the conditioned airflow from the flow rectifier 28 and turns it to a desired direction.

In the preferred embodiment shown in FIGS. 1, 4, 5 and 8, the individual vanes 52 are equally spaced and extend substantially the entire width between the side walls 36. The size and number of individual vanes 52 is determined by the volume and direction of the airflow that is required to be redirected. In the preferred embodiment, the individual vanes 52 redirect airflow that is moving in a substantially vertical direction through a sufficient angular change such that it enters the test chamber 14 substantially horizontally. In the preferred embodiment the individual vanes 52 have an arc length of between about 85 to 100 degrees, more preferably there are 14 individual vanes 52 each having an arc length of about 95 degrees. The arc length of each individual turning 52 vane is preferably determined in accordance with the variations in direction of airflow received from the air inlet structure 12.

The individual vanes 52 are preferably attached to the vane supports 54 or side walls 36. Each individual vane 52 preferably spans the distance between the vane supports 54 or for the sections near the side walls 36, the distance between the side wall 36 and a vane support 54. The individual vanes 52 are preferably attached to the vane supports 54 in a manner to minimize disruption to airflow, including but not limited to the use of nuts and bolts, welding or adhesive. The individual vanes 52 preferably include a flange (not shown) to assist with their attachment to the vane supports 54. In an alternative embodiment (not shown), the vane supports 54 include a ledge on which the individual vanes 52 rest.

In the preferred embodiment, the vane supports 54 extend from the bottom of the front wall 32 of the air inlet structure 12 to the bottom of the rear wall 34, most preferably at about a 45 degree angle. Each vane support 54 is designed to minimize disruption to the air flow presented to the test chamber 14. Preferably, the vane supports 54 are flat plates and include a fairing (not shown) to prevent air flow distortions or turbulence from forming as the airflow contacts them. The size and number of vane supports 54 used is preferably determined by the materials used in construction of the turning vane 30. For instance, if a strong material is used, the vane supports 54 can be made smaller and still maintain the individual vanes 52 in the preferred position.

Preferably, the number of vane supports 54 is minimized to reduce disruptions in the airflow. However, there should be a sufficient number of vane supports 54 to maintain the individual vanes 52 in a desired position. In the preferred embodiment, the individual vanes 52 are in a substantially horizontal position. In the preferred embodiment, the individual vanes 52 and vane supports 54 are made from materials such as corrosion preventive steel, but other types of materials could be used as long as the material used allows the turning vanes 52 to redirect the airflow from the flow rectifier 28 to the test chamber 14.

Figure 12:
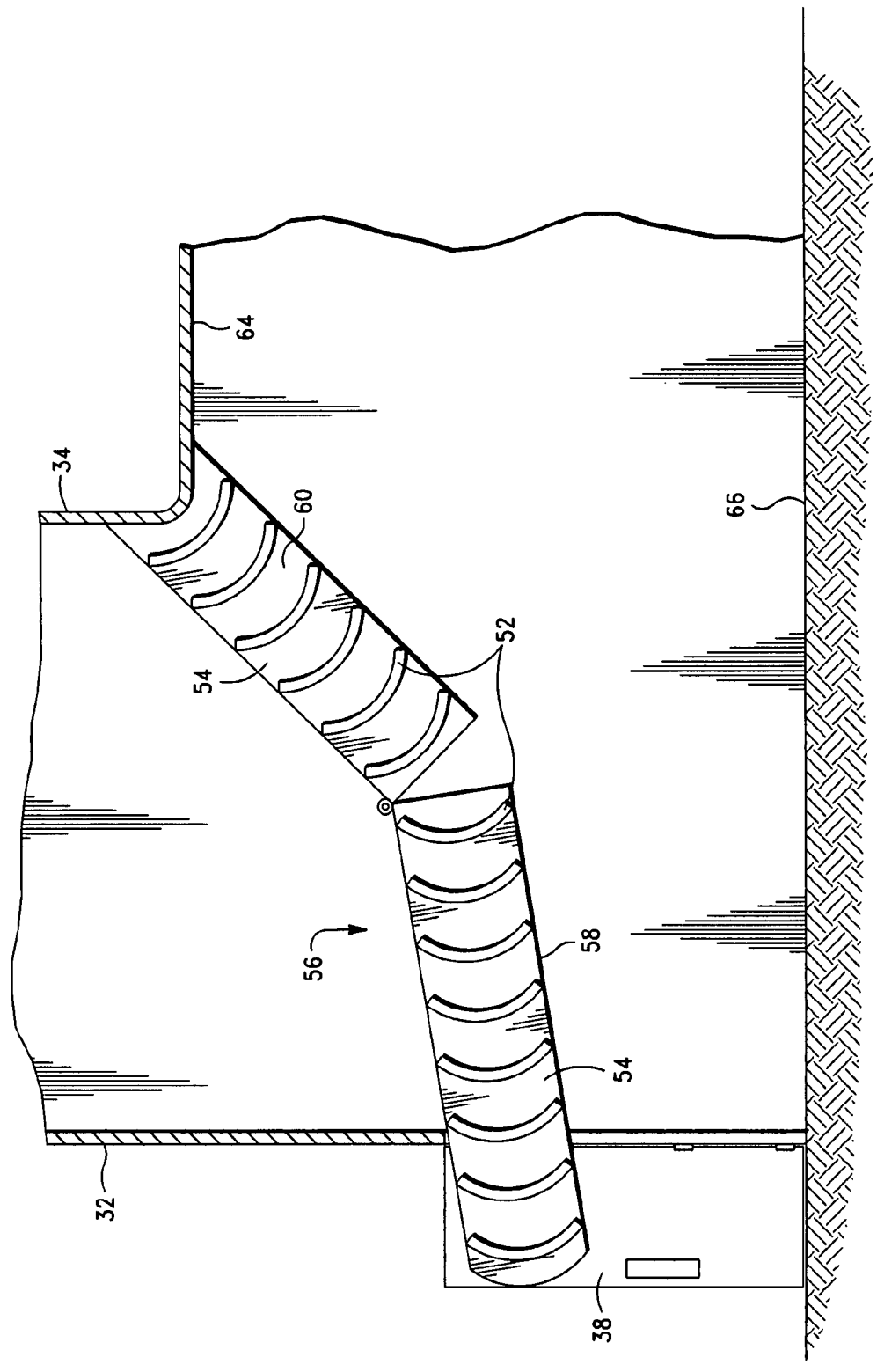
FIG. 12 is a fragmented sectional view of the intake of the ground run-up enclosure shown in FIG. 1 taken along line 12-12 of FIG. 4 showing the lower portion of the turning vane in the raised position.

In the preferred embodiment as shown in FIG. 12, the turning vane 30 includes a moveable section 56. The moveable section 56 allows equipment such as an aircraft tug to be removed from test chamber 14 by taking the tug through the space created in the turning vane 30. The moveable section preferably comprises a center section of the individual vanes 52 and at least one vane support 54. The lower section 58 of the vane support 54 is preferably hinged to the upper section 60 of the vane support 54. The portion of each individual vane 52 attached to the lower section 58 is preferably detached from the remaining portion of the individual vane 52. When desired, the lower section 58 of the vane support 54 is rotated upwards and out of the way. The tug or other equipment can then be removed through the space cleared in the turning vane 30 by the moveable section 56 and out the door 38 in the front wall 32.

As shown in FIGS. 1, 2 and 4, the test chamber 14 is adapted to receive a portion of the test aircraft 20 in such a manner as to allow the aircraft's engines 50 to be run for an extended period in an airflow which simulates straight and level flight conditions. The test chamber 14 preferably comprises observation room 62, ceiling 64, floor 66, two side walls 68, prop ring 70, and overhang 72.

The observation room 62 preferably sits adjacent to the test chamber 14 such that it does not interfere with any airflow directed to the test chamber 14 from the turning vane 30. The observation room 62 is preferably constructed with walls that include acoustic insulation to reduce the noise transmitted from the test chamber 14. The observation room 62 preferably includes an acoustically treated window 74 to allow people testing the engines to view the aircraft 20 during the ground run-up procedure without subjecting themselves to the noise and airflow inside the test chamber 14.

While ceiling 64 could be constructed with materials that provide sufficient strength to span the width of the test chamber 14, the ceiling 64 of the test chamber 14 is preferably supported by one or more pillars (not shown). In the preferred embodiment, the pillars are positioned near the turning vane 30. The pillars are preferably designed to bear a portion of the ceiling's weight. This allows the use of materials that would not have sufficient strength to span the width of the test chamber 14. The pillars are also preferably designed to minimize their interference with the airflow directed to the test chamber 14. In the preferred embodiment, the pillars include a fairing to prevent airflow disruptions or turbulence from forming around the pillars in the airflow. The pillars could be formed from a round tube, a rectangular tube, I-beam or other various shapes as long as they have a minimal effect on the airflow.

The ceiling 64 is preferably designed to guide the airflow from the turning vane 30 to the aircraft's engines 50 and to reduce the noise levels passed from the test chamber 14 to the environment. In the preferred embodiment, the ceiling 64 of the test chamber 14 is acoustically treated. In a most preferred embodiment, the ceiling 64 is constructed from metal panels with acoustic insulation. Other materials, such as concrete, could also be used as long as they provide sufficient noise reduction and have minimal interference with the airflow in the test chamber 14. The ceiling 64 preferably includes a roof structure (not shown) as is known in the art. The roof structure provides the test chamber 14 with protection from weather and is preferably sloped in the direction of the acoustic enclosure 16 to allow drainage of excess moisture.

The test chamber 14 also preferably comprises an airflow draft barrier (not shown) designed to temporarily block airflow from the air inlet structure 12 to the test chamber 14 when maintenance is being performed on the aircraft 20, inlet structure 12 or test chamber 14. The draft barrier allows maintenance people to work on the aircraft engines 50 without being subjected to wind blowing through the test chamber 14. The airflow draft barrier is preferably stored in a manner to minimally affect airflow when not in use. In the preferred embodiment, the draft barrier operates as a garage door stored in the up position within the ceiling and is pulled down on tracks located in side walls 68 to block airflow from the inlet structure 12. Although the draft barrier is preferably stored within the ceiling 64, it could be stored anywhere that would not interrupt the flow of air into the test chamber 14.

The floor 66 is preferably designed to guide the airflow from the turning vane 30 to the aircraft's engines 50. The floor 66 of the test chamber 14 is preferably created from a material of sufficient strength to support the weight of the aircraft 20 desired to be tested, and is most preferably made from concrete. At least two wheel chocks 80 are provided to assist with positioning the aircraft 20 in a desired aircraft test position and to assist with maintaining the aircraft 20 in that position during testing. The wheel chocks 80 are preferably adjustable so that they can be positioned in various locations depending on the type of aircraft to be tested and desired alignment of the aircraft. In an alternative embodiment, the wheel chocks 80 are any typical wheel chock known in the art.

In the preferred embodiment, the floor 66 of the test chamber 14 is sloped downward from the prop ring 70 to the air inlet structure 12. The slope allows for drainage of any liquids (i.e. fuel, oil) that may land on the floor away from the engines 50.

The walls 68 are preferably designed to guide the airflow from the turning vane 30 to the aircraft's engines 50 and to reduce the noise levels passed from the test chamber 14 to the environment. In the preferred embodiment, the walls 68 of the test chamber 14 are acoustically treated, and are most preferably constructed from metal panels with acoustic insulation as is known in the art. Other materials, such as concrete, could also be used as long as the materials used provided sufficient noise reduction and had minimal interference with the airflow in the test chamber 14.

The walls 68 preferably include at least one door 67 to allow personnel or equipment access to the air inlet structure 12 and/or test chamber 14. The doors should be designed to reduce the noise transmitted from the aircraft engines to the outside environment. In the preferred embodiment, doors 67 are made from metal and include acoustic damping materials. In a most preferred embodiment, the door 67 is an acoustical steel door as is known in the art.

The prop ring 70 is configured to focus airflow towards the aircraft engine propellers and prevent the exhausted airflow from the engine from re-circulating into the test chamber 14. The prop ring 70 comprises a ceiling wall 82, two side walls 84, 86 and two floor walls 88, 90. In the preferred embodiment, the floor walls 88, 90 are spaced apart to allow the aircraft fuselage to pass between them. The ceiling wall 82 and two floor walls 88, 90 are positioned in such a manner as to allow propellers 92 of the aircraft 20 to be positioned forward of or within the prop ring 70 during the ground run-up procedure. The side walls 84, 86 are also preferably positioned to allow sufficient clearance for the propellers to be positioned forward of or within the prop ring 70.

In another embodiment, the prop ring 70 further comprises a bell mouth (not shown) that assists with focusing airflow towards the propellers. The bell mouth is preferably a curved structure that substantially spans the width and height of the prop ring 70. The curvature preferably extends from the prop ring 70 or even behind the prop ring 70 toward the turning vane 30. The bell mouth operates in similar principle to a nozzle, directing the airflow passing through the test chamber 14 into the opening defined by the prop ring 70.

In the preferred embodiment, the floor walls 88, 90, ceiling wall 82 and side walls 84, 86 are permanently fixed in the test chamber 14. In an alternative embodiment, one or more of the floor walls 88, 90, ceiling wall 82 and side walls 84, 86 are adjustable to change the amount of open area behind the propellers 92. It is important to have sufficient clearance behind the propellers so that the propeller exhaust airflow is not substantially impeded by the prop ring 70 so as to create a reflected pressure gradient on the propellers 92.

The floor walls 88, 90 are preferably made from concrete, about one-third meters thick and one-half meter in height. The side walls 84, 86 and ceiling wall 82 are preferably made from steel and most preferably about nine meters in height, one meter in width and one-third meter thick. The ceiling wall 82 preferably spans most of the width of the test chamber 14 and abuts the two side walls 84, 86. In a most preferred embodiment, the ceiling wall 82 is about one-third meters thick and one-half meter in height.

Although not shown in the drawings, side walls 84, 86 are preferably movable between an open and closed position. Preferably, the side walls 84, 86 consist of several sections that move about a hinge to allow the user to choose between various sizes of the prop ring 70 depending on the particular aircraft 20 that is to be tested. In a most preferred embodiment, each of the side walls 84, 86 is hinged to allow rotation between the open and closed positions.

Overhang 72 extends from the test chamber ceiling 64 beyond the test chamber 14 into the acoustical enclosure 16. The overhang 72 is configured to maintain the airflow in the aft direction and prevent any re-circulation back into the test chamber 14. In addition, the overhang 72 is configured to redirect sound waves in an aft direction into the acoustical enclosure 16. As an added benefit, the overhang 72 extends beyond the prop ring 70 a sufficient distance to provide cover over wing mounted engines 50 and allow maintenance workers to work on the engines 50 in a sheltered environment. Overhang 72 preferably extends beyond the prop ring 70 from about 3 to 7 meters and is most preferably about 5.5 meters. Overhang 72 is preferably constructed from acoustically treated materials and is most preferably constructed from metal panels with acoustic insulation.

Overhang 72 preferably also includes a pair of acoustic wing walls (not shown) extending down from the sides of the overhang 72. The acoustic wing walls are preferably constructed from acoustically treated materials to reduce the noise transmitted to the surrounding environment. In a most preferred embodiment, the acoustic wing walls include acoustic tiles on the inner surfaces.

As is shown in FIGS. 1, 3, 4 and 7, acoustic enclosure 16 preferably substantially surrounds the airflow exhausted from the test chamber 14. The acoustic enclosure 16 is formed from acoustical barrier walls 100. The walls 100 consist of a front wall 102, a pair of side walls 104, 106 and a pair of rear walls 108, 110. The front wall 102 preferably intersects the test chamber 14 at a point forward of the prop ring 70 allowing the overhang 72 to extend into the acoustic enclosure 16. The front wall 102 extends vertically upward from the top of the ceiling of the testing chamber 14, preferably perpendicular to the exhausted airflow.

Front wall 102 preferably includes a portion that runs across the roof structure of the test chamber 14. In the preferred embodiment, the front wall 102 is the same height as the side walls 104, 106. In an alternative embodiment (not shown), the front wall 102 is a different height than the side walls 104, 106. The walls 100 are preferably between about 8 meters and 20 meters in height, more preferably between about 11 meters and 16, and most preferably between about 13 meters and 15 meters in height.

In the preferred embodiment, the side walls 104, 106 of the acoustic enclosure 16 basically form right angles with the front walls 102 and the rear walls 108, 110. The distance between the side walls 104, 106 and the width of the front wall 102 must be larger than the wing span of the largest aircraft desired to be tested in the facility.

Various conventional methods for making acoustical barrier walls are known, including but not limited to those that are described in U.S. Pat. No. 6,016,888 which is incorporated herein by reference and those made by Blast Deflectors, Inc. of Reno, Nev. and Vital Link, Inc. of San Antonio, Tex. In the preferred embodiment, the walls 100 of the acoustic enclosure 16 are made from metal panels and have sound absorbing acoustic panels or tiles 112 to reduce the amount of noise transmitted from the ground run-up enclosure 10 to the outside environment. The walls 100 are preferably supported by galvanized steel trusses 114, but other types of materials or wall support designs could also be employed.

In another embodiment (not shown in the drawings), the walls 100 include a smooth inner surface. The smooth surfaces are designed to reflect sound waves. To achieve the desired acoustical dampening effect, the walls 100 are positioned at an angle sufficient to direct the sound waves up and away from the acoustic enclosure and the surrounding environment. By directing the sound waves in an upward direction, the noise from the aircraft engines reaching the surrounding areas is reduced. After the sound waves exit the test chamber 14, the sound waves contact the smooth surface of the barrier walls 100. The sound waves are deflected in an upwards direction. In this preferred embodiment, the walls 100 are made from galvanized steel, but other materials with appropriate sound wave reflection characteristics could be used as well. In this preferred embodiment, the walls are configured to lean back and extend upwardly at an outward angle that is about 15 degrees.

The floor 116 of the acoustic enclosure 16 is preferably sloped from the center of the acoustic enclosure to the side walls 102, 104. The slope of the floor assists with the drainage of any liquids that may enter the acoustic enclosure or may leak from the aircraft. In a most preferred embodiment, the floor 116 is constructed from concrete.

The main enclosure door 18 of the preferred embodiment redirects the exhausted airflow from a horizontal direction to a near vertical direction with a minimal reflected pressure gradient. The minimal reflected pressure gradient is caused by the smooth transition of the engine exhausted airflow from a substantially horizontal direction to a more vertical direction. The smooth transition does cause an increase in pressure of the exhaust airflow at the main enclosure door 18. If the exhausted airflow were to encounter an obstacle that prevented a smooth transition, the air pressure increases. This would increase the pressure of the airflow around the test chamber 14. This reflected pressure could consequently cause instability of the propellers of the aircraft 20. In a propeller driven aircraft, the propellers can only handle a limited fluctuation in torque as specified by the engine manufacturer. Thus, it is important to reduce the reflected pressure gradient.

In the preferred embodiment, the main enclosure door 18 opens as a one piece structure. As shown in FIGS. 3 and 4, the main enclosure door 18 is preferably mounted on a track. To open the main enclosure door 18, it is moved away from the side walls 104, 106 on the track by a force provided by a motor, tug or even manually. The track preferably does not run perpendicularly to the side walls 104, 106 of the acoustic enclosure 16, but at an angle so the main enclosure door 18 pulls away from the side walls 104, 106 of the acoustic enclosure 16. This prevents the main enclosure door 18 from rubbing against the side walls 104, 106 as it is opened or closed. In the preferred embodiment, the rear walls 108,110 of the acoustic enclosure are connected to the main enclosure door 18 in such a manner so that they also slide on the track when the main enclosure door 18 is open and closed. In another preferred embodiment (not shown), the main enclosure door 18 is wide enough that it abuts the side walls 104, 106 directly, thereby eliminating the need for the rear walls 108, 110.

In another embodiment (not shown), the main enclosure door 18 is a two piece structure that rotates to open at the juncture of the two pieces and close about a pair of hinges. It should be understood that the main enclosure door 18 could be opened and closed in any manner known in the art or later developed as long as an aircraft 20 can be brought into the aircraft ground run-up enclosure 10 and positioned in the test chamber 14.

The main enclosure door 18 is preferably comprised of a front surface 118 adapted to redirect the exhaust airflow upward and out of the acoustic enclosure, and a bracing structure 120 configured to support the front surface 118 and assist the door 18 with moving between open and closed positions. In the preferred embodiment, the front surface is comprised of a nose roll 122, a curved section 124 and a substantially vertical section 126.

Figure 10:
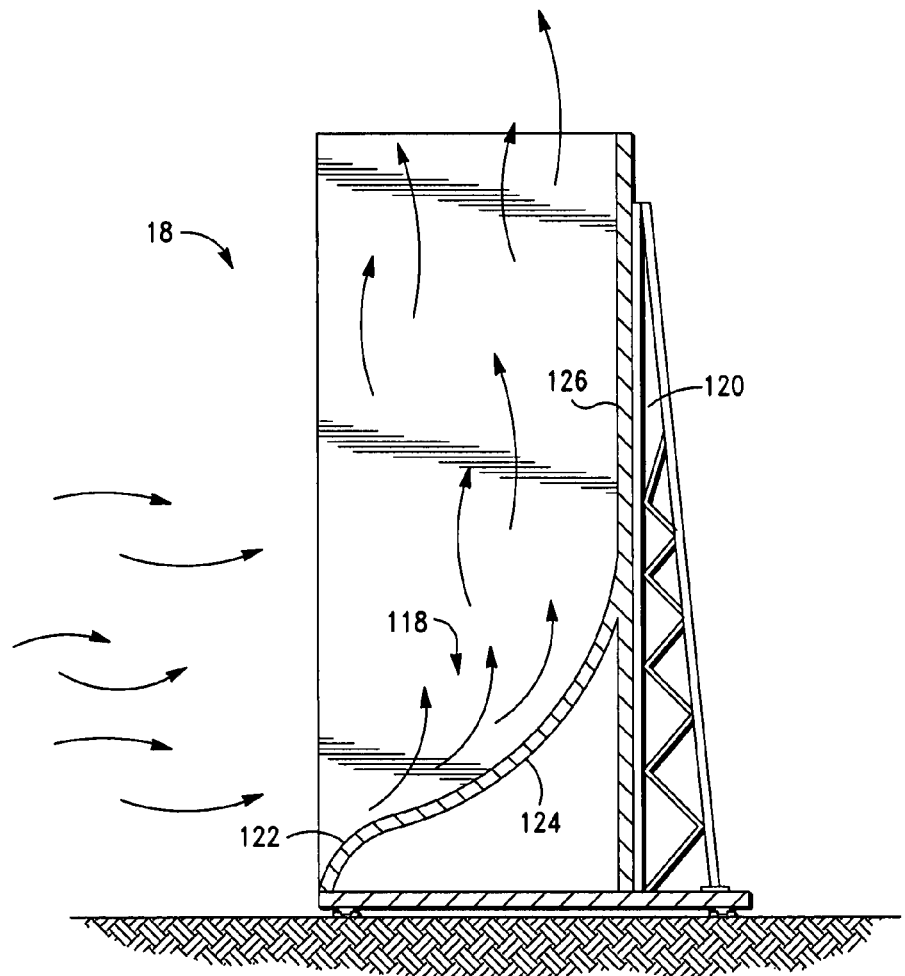
FIG. 10 is a side sectional view of the main enclosure door of the ground run-up enclosure shown in FIG. 1.
Figure 11:
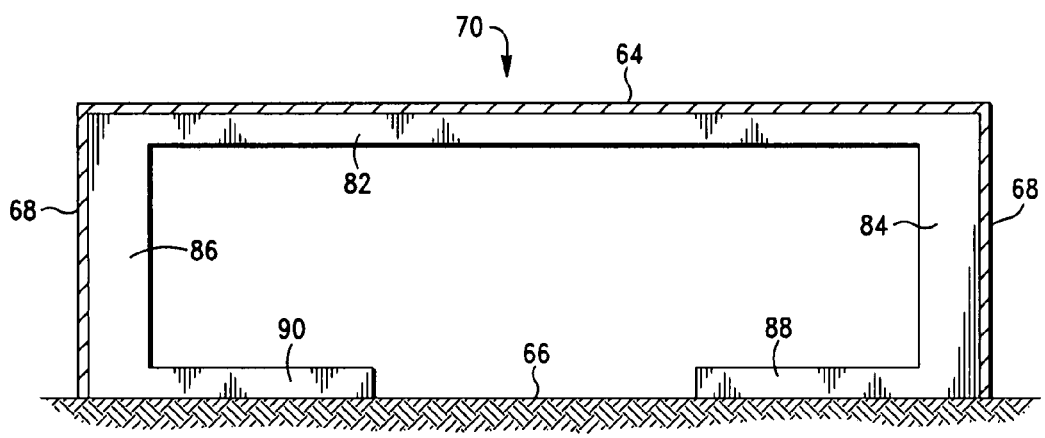
FIG. 11 is a fragmented sectional view of the test chamber of the ground run-up enclosure shown in FIG. 1 taken along line 11-11 of FIG. 3 showing the prop ring.

As is shown in FIGS. 1 and 10, the nose roll 122 is a convex surface along the bottom of the main enclosure door 18 that intercepts the engine exhaust airflow at ground level and guides it upwards. The nose roll 122 reduces the reflected pressure gradient caused by the exhaust airflow encountering the front surface 118 of the main enclosure door 18. In the preferred embodiment shown in the drawings, the nose roll 122 consists of an arc formed from a constant radius, most preferably a radius of about 0.8 meters. The nose roll 122 transitions into the concave curved section 124. The curved section 124 consists of a gentle arc that guides the exhaust airflow through about a 70 to 90 degree change in direction. In the preferred embodiment shown in the drawings, the curved section 124 consists of an arc formed from a constant radius and most preferably a radius of about 6 meters. The curved section 124 transitions into the substantially vertical section 126 of the main enclosure door 18. The substantially vertical section 126 guides the exhaust airflow up and out of the aircraft ground run-up enclosure 10. In the preferred embodiment, the substantially vertical section 126 comprises at least half of the front surface 118.

In the preferred embodiment, the front surface 118 is a substantially continuous surface that guides airflow out of the ground run-up enclosure 10 and assists with preventing recirculation of engine exhaust airflow. The front surface 118 is preferably smooth, but could also be formed from a material with corrugations that follow the curves of the nose roll 122 and curved section 124. The front surface 118 is preferably at least as wide as the test chamber 14. In the preferred embodiment shown in the drawings, the front surface 118 is substantially the same width as the front wall 102 of the acoustical enclosure 16, and substantially equal in width to that of the test chamber 14.

The bracing structure 120 preferably consists of galvanized steel trusses, but other types of materials or support designs could be employed. The bracing structure 120 is adapted to support the front surface 118 while absorbing the force generated by the engine exhaust airflow. In one preferred embodiment the bracing structure 120 includes a cover (not shown). The cover is preferably formed from metal such as galvanized steel, but other types of materials could be used as well. The cover is adapted to provide the bracing structure and mechanisms used to open and close the main enclosure door 18.

To use the aircraft ground run-up enclosure 10, the main enclosure door 18 is moved into the open position. An aircraft 20 is then moved via a tug or other means of towing the aircraft and into the desired aircraft testing position. For a propeller type aircraft, the aircraft 20 is positioned in the test chamber 14 such that the propellers 50 are positioned forward of the prop ring 70. Once the aircraft 20 is in the desired position, the wheel chocks 80 are put into place. The aircraft tug is preferably removed from the test chamber 14 by raising the moveable section 56 of the turning vane 30 which pivots up and away from the tug to allow it to exit the door 38 in the front wall of the air inlet structure 12. Moveable section 56 is then returned to its test position and the main enclosure door 18 is moved to its closed position.

The aircraft begins the ground run-up procedure. As the aircraft engines spool up, air is drawn through the air inlet structure 12. Air is drawn into opening 44 across lip roll 24 and down into the flow rectifier 28, a portion of the airflow passes through the flow conditioning screen 26. As the airflow passes through the flow rectifier 28, the airflow is conditioned and is traveling in a substantially vertical direction.

Next, the airflow comes in contact with the turning vane 30 which guides the airflow through a change in direction. The airflow is presented to the aircraft 20 in a substantially horizontal direction in the test chamber 14. Then, the airflow contacts the aircraft propellers and is accelerated through the prop ring 70. The exhaust airflow exits out of the test chamber 14 into the acoustic enclosure 16 until it contacts the front surface 118 of the main enclosure door 18. As the exhaust airflow encounters the main enclosure door 18, the front surface 118 guides the airflow through a 70 to 90 degree change in direction such that the exhaust airflow is directed up and out of the acoustic enclosure.

During the ground run-up procedure, the noise generated by the aircraft engines and propellers is substantially reduced to a person situated outside the ground run-up enclosure when compared with a person similarly situated to an aircraft performing a ground run-up procedure on an open runway. The noise is preferably either absorbed by materials within the ground run-up enclosure or the sound waves are directed up into the atmosphere where they are allowed to dissipate.

From the foregoing it will be seen that this invention is one well adapted to attain all ends and objectives herein-above set forth, together with the other advantages which are obvious and which are inherent to the invention.

Since many possible embodiments may be made of the invention without departing from the scope thereof, is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims.

The invention claimed is:

1. An aircraft ground run-up enclosure comprising:
   a test chamber capable of receiving a portion of an aircraft therein, wherein the test chamber includes a prop ring;
   an air inlet structure adapted to receive ambient air and direct it into said test chamber, wherein at least a portion of said air inlet structure is positioned forward of said test chamber;
   an acoustic enclosure configured to receive airflow from said test chamber and which substantially surrounds the airflow, wherein at least a portion of said acoustic enclosure is positioned rearward of said test chamber; and
   a main enclosure door positioned at the rear of said acoustic enclosure, wherein said main enclosure door comprises a front surface facing said test chamber adapted to redirect air currents upward and out of the aircraft ground run-up enclosure, and wherein said main enclosure door is moveable between a closed position and an open position for allowing at least a portion of an aircraft to enter the test chamber.

2. The aircraft ground run-up enclosure according to claim 1, wherein said prop ring is configured to allow at least a portion of an aircraft engine to move through the ring.

3. The aircraft ground run-up enclosure according to claim 1, wherein said prop ring defines an air passage through said test chamber and wherein said defined air passage is variable depending on the type of aircraft positioned in said test chamber.

4. The aircraft ground run-up enclosure according to claim 3, wherein said prop ring comprises two side walls that are configured to be moved between an open and a closed position.

5. The aircraft ground run-up enclosure according to claim 1, wherein said prop ring comprises two floor walls spaced apart a sufficient distance to allow an aircraft fuselage to pass between them.

6. The aircraft ground run-up enclosure according to claim 1, wherein said air inlet structure comprises a flow rectifier adapted to substantially condition airflow passing through said air inlet structure.

7. The aircraft ground run-up enclosure according to claim 4, wherein said flow rectifier comprises a series of vertical plates that define uniform passages for airflow.

8. The aircraft ground run-up enclosure according to claim 1, wherein said air inlet structure comprises a flow conditioning screen adapted to regulate airflow passing through said inlet structure.

9. The aircraft ground run-up enclosure according to claim 6, wherein said air inlet structure further comprises a flow conditioning screen positioned above said flow rectifier.

10. The aircraft ground run-up enclosure according to claim 9, wherein said flow conditioning screen is a perforated plate having a porosity of between 60% and 80%.

11. The aircraft ground run-up enclosure according to claim 1, further comprising a turning vane adapted vane adapted to deflect airflow passing through said air inlet structure said test chamber.

12. The aircraft ground run-up enclosure according to claim 11, wherein said test chamber comprises a floor, side walls supported by said floor, and ceiling supported by said side wall, and wherein said turning vane comprises a plurality of individual turning vanes vertically spaced from said ceiling to said floor and extending substantially the entire distance between said side walls to guide the airflow through a change in direction such that the airflow into the test chamber is flowing in a substantially horizontal direction.

13. The aircraft ground run-up enclosure according to claim 11, wherein at least a portion of said turning vane is moveable to allow an aircraft tug to be removed from said air inlet structure.

14. The aircraft ground run-up enclosure according to claim 1, wherein said air inlet structure comprises a lip roll adapted to condition airflow passing into said air inlet structure.

15. The aircraft ground run-up enclosure according to claim 14, wherein said lip roll comprises a curved surface adapted to allow airflow to attach to said surface and be pulled into said opening.

16. The aircraft ground run-up enclosure according to claim 14, wherein said lip roll comprises an arc in cross section with an arc length of between 90 and 270 degrees.

17. The aircraft ground run-up enclosure according to claim 1, wherein said main enclosure door moves between said open position and said closed position as a one piece structure.

18. The aircraft ground run-up enclosure according to claim 1, wherein said front surface comprises a nose roll.

19. The aircraft ground run-up enclosure according to claim 1, wherein said acoustic enclosure comprises at least two substantially vertical walls.

20. The aircraft ground run-up enclosure according to claim 19, wherein said vertical walls are acoustically treated.

21. An aircraft ground run-up enclosure comprising:
an air inlet structure adapted to receive ambient air and direct it into said ground run-up enclosure;
a test chamber capable of receiving a portion of an aircraft therein, wherein at least a portion of said test chamber is positioned rearward of said air inlet structure;
an acoustic enclosure that is at least partially open to the atmosphere, wherein at least a portion of said acoustic enclosure is positioned rearward of said test chamber; and
a main enclosure door positioned at the rear of said acoustic enclosure and moveable between a closed position and an open position for allowing at least a portion of an aircraft into said test chamber, said main enclosure door comprising a front surface facing said test chamber adapted to redirect air currents upward and out of the aircraft ground run-up enclosure, wherein said front surface includes a nose roll.

22. The aircraft ground run-up enclosure according to claim 21, wherein said air inlet structure comprises a flow rectifier and a turning vane.

23. The aircraft ground run-up enclosure according to claim 21, wherein said air inlet structure comprises a flow conditioning screen.

24. The aircraft ground run-up enclosure according to claim 21, wherein said test chamber comprises a prop ring to focus airflow from said acoustic enclosure to said test chamber.

25. An aircraft ground run-up enclosure comprising:
a means for receiving ambient air into said aircraft ground run-up enclosure in a substantially uniform manner;
a means for conditioning said substantially uniform airflow;
a means for directing air towards an aircraft positioned within said aircraft ground run-up enclosure;
a means for damping acoustic noise associated with operating said aircraft; and
a means for redirecting airflow out of said aircraft ground run-up enclosure, said airflow redirecting means positioned reaward of said air directing means, and wherein said airflow redirecting means is moveable between a closed position and an open position for allowing said aircraft into said aircraft ground run-up enclosure.

26. The aircraft ground run-up enclosure according to claim 1, wherein the prop ring is configured to allow at least a portion of a propeller from a propeller type aircraft to move through the ring, and wherein the prop ring is configured to focus toward the propeller and prevent the exhausted airflow from the propeller from re-circulating into said test chamber when at least a portion of said prop ring is positioned rearward of the propeller.

* * * * *

UNITED STATES PATENT AND TRADEMARK OFFICE
CERTIFICATE OF CORRECTION

PATENT NO. : 7,600,605 B2  
APPLICATION NO. : 10/558324  
DATED : October 13, 2009  
INVENTOR(S) : Roark et al.

Page 1 of 1

It is certified that error appears in the above-identified patent and that said Letters Patent is hereby corrected as shown below:

Column 12, Lines 37-38
Delete "claim 4" and insert -- claim 6 -- therefor.

Column 12, Lines 51-52
Delete "vane adapted.".

Column 12, Line 53
Insert -- toward -- between "structure" and "said".

Column 12, Line 56
Insert -- a -- between "and" and "ceiling.".

Column 12, Line 57
Delete "wall" and insert -- walls -- therefor.

Column 14, Line 25
Delete "reaward" and insert -- rearward -- therefor.

Column 14, Line 33
Insert -- airflow -- between "focus" and "toward.".

Signed and Sealed this

Twenty-third Day of February, 2010

David J. Kappos
*Director of the United States Patent and Trademark Office*